United States Patent [19]

Jones et al.

[11] 3,771,512

[45] Nov. 13, 1973

[54] SYSTEM FOR MEASURING TIMED FORCED EXPIRATORY VOLUME

[75] Inventors: William C. Jones, Elmhurst; Harry R. Jones, Hinsdale, both of Ill.

[73] Assignee: said William C. Jones, by said Harry R. Jones

[22] Filed: Aug. 19, 1971

[21] Appl. No.: 173,173

[52] U.S. Cl. .............................. 128/2.08, 73/194 E

[51] Int. Cl. .............................................. A61b 5/08

[58] Field of Search .......................... 128/2.08, 2.07; 73/194 E, 195, 234, 239, 262, 194 R

[56] References Cited

UNITED STATES PATENTS

| | | | |
|---|---|---|---|
| 3,577,984 | 5/1971 | Levy et al. | 128/2.08 |
| 3,621,835 | 11/1971 | Suzuki et al. | 128/2.08 |
| 3,608,546 | 9/1971 | Shinn | 128/2.08 |
| 3,606,883 | 9/1971 | Poirer et al. | 128/2.08 |
| 3,559,638 | 2/1971 | Potter | 128/2.08 |
| 3,006,336 | 10/1961 | Burlis et al. | 128/2.08 |
| 3,086,515 | 4/1963 | Jones | 128/2.08 |

*Primary Examiner*—Kyle L. Howell
*Attorney*—Dawson, Tilton, Fallon & Lungmus

[57] ABSTRACT

The system generates a signal representative of instantaneous forced expiratory volume for three successive tests. The signal is fed to a multi-channel analog memory. Each channel includes a peak detector circuit and a meter or other recording or measuring means. One channel measures and records the largest value of total forced expiratory volume for the three tests; and the other channels measure and record the largest value of forced expiratory volumes at predetermined time increments for the three tests. Circuitry is included for directly computing the timed forced expiratory volumes as percentages of the total forced expiratory volume. The three tests are also recorded on a graph. Another memory channel may be included for storing a signal representative of the maximum flow rate for the tests. The memory channels are all reset in common after the completion of the tests.

6 Claims, 3 Drawing Figures

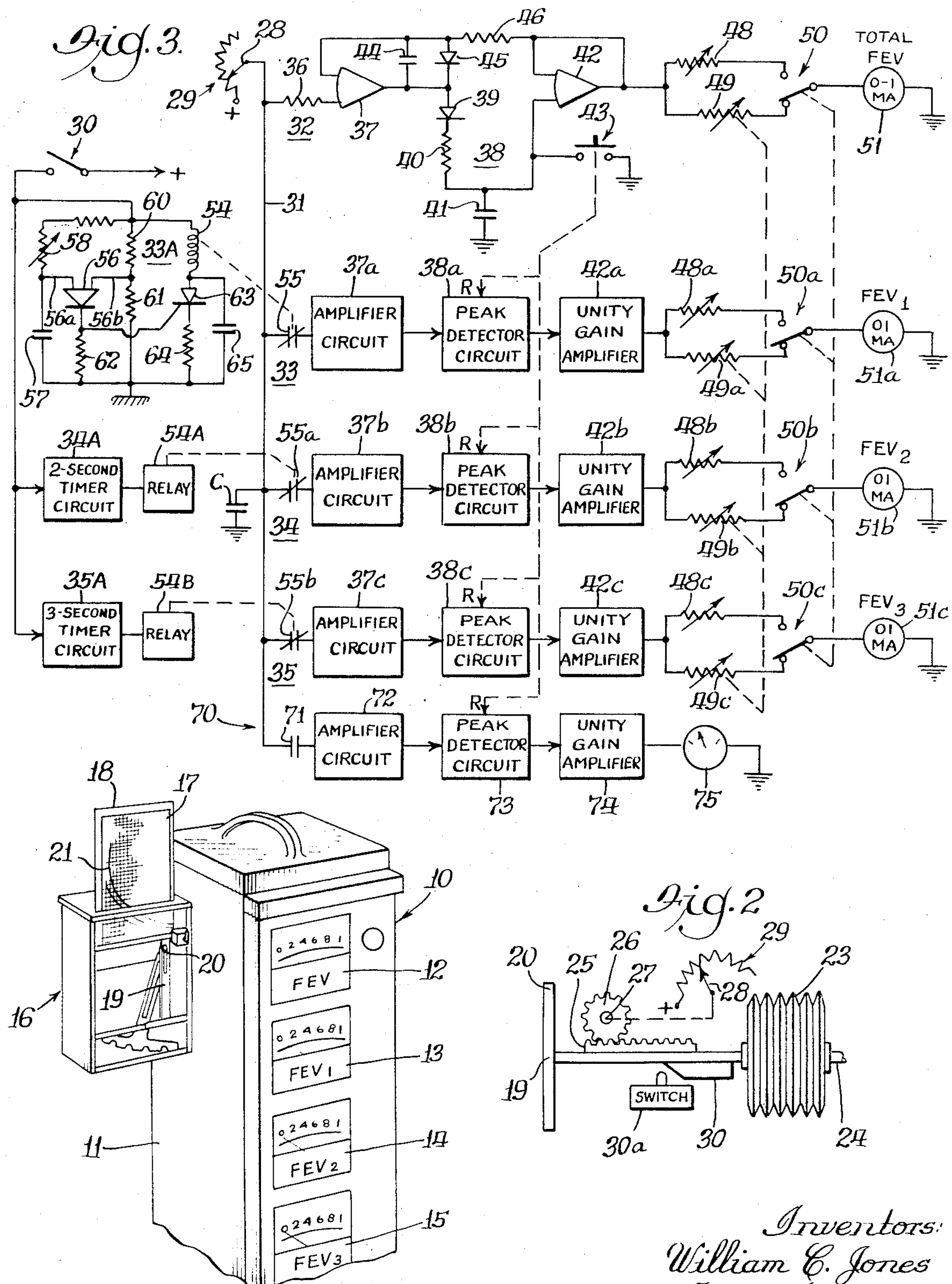
Inventors:
William C. Jones
Harry R. Jones
By: Dawson, Tilton, Fallon & Lungmus
Att'ys.

SYSTEM FOR MEASURING TIMED FORCED EXPIRATORY VOLUME

BACKGROUND OF THE INVENTION

1. Field of the Invention

The present invention relates to a system for measuring and recording forced expiratory volume; and more particularly, it relates to an electronic system for measuring and recording timed forced expiratory volume.

Forced expiratory volume tests are well-known in the art and as a diagnostic test for people with respiratory ailments. In these tests, a person is required to take a deep breath and then exhale as quickly as possible. The total forced expiratory volume is the total volume of air exhaled from the lungs during a test. A timed forced expiratory volume test indicates the forced expiratory volume at predetermined times during a test, for example, at one-second intervals. Typically, a complete test will include values of timed forced expiratory volume at intervals of 1 second, 2 seconds and 3 seconds after a test is initiated, as well as the total forced expiratory volume.

2. Present Techniques

One commercial system for measuring forced expiratory volume and timed forced expiratory volume includes a stylus which is driven in one direction, the displacement relative to a base line being representative of the instantaneous forced expiratory volume. The stylus records on a sheet of graph paper which is moved in an orthogonal direction as a function of time. Thus, there is generated a volume-time relationship.

Normally, three successive tests are recorded on the same graph, and the graph is reciprocated so that the three curves or characteristics are superimposed. An experienced technician can tell from an observation of the three recorded characteristics whether or not the test is a valid one. That is, the three characteristics recorded should have generally the same shape and appearance, and they should record approximately the same total forced expiratory volume for each test. In order to obtain the timed forced expiratory volumes required, the operator then uses the optimum or highest of the three recorded curves and writes on a separate record the volume shown for the maximum curve for each of three separate timed intervals--usually one second, two seconds and three seconds after the initiation of the test.

This procedure entails a possibility of errors arising in interpreting the graph, either in locating the proper coordinate for the respective timed forced expiratory volumes or in reading the correct abscissa for the time increments required. Further, once the readings are made, the values for the timed forced expiratory volumes as well as the total forced expiratory volume must be separately recorded. If it is then required to convert the timed forced expiratory volume measurements to percentages of the total forced expiratory volume, calculations must be made.

SUMMARY

In the present system, an electrical signal is generated representative of instantaneous forced expiratory volume for each of three successive tests. The signal is fed to a multi-channel analog memory. For a system measuring total forced expiratory volume as well as timed forced expiratory volume at one second, two seconds and three seconds after test initiation, there are four analog memory channels.

Each channel includes a peak detector circuit and a meter or other recording or measuring means. One channel measures and stores signals representative of the largest value of total forced expiratory volume for the three tests. The other channels are disconnected at their respective time increments during each of the three tests; and they store signals representative of the largest timed forced expiratory volumes for the three second intervals for all three tests. For example, if the timed forced expiratory volume at the 1-second time mark for the first test is smaller than the corresponding timed forced expiratory volume for the second test, the first memory channel records in its peak detector circuit the measurement for the second test at the one-second mark.

In a preferred embodiment each of the channels includes a meter. Hence, on the four meters are shown respectively the largest of the total forced expiratory volumes for the three tests as well as the largest of the three timed forced expiratory volumes.

Circuitry is also included for converting each of the three timed forced expiratory volumes that are stored in the system to a percentage of the largest recorded total forced expiratory volume. All three channels are reset in common after completion of the tests.

In addition, the three tests are recorded on a common graph so that a visual observation of the superimposed graphs will indicate to an operator whether or not the tests are valid. Thus, with the present system, an operator determines first that a series of tests is valid; and if it is, he has recorded on four separate meters signals representative of the optimum values for the total forced expiratory volume as well as optimum readings for the three timed forced expiratory volumes. These readings represent the maximum values for all of the three different tests that have been run. If he wishes to convert the three timed forced expiratory volumes to percentages, he merely throws a switch and adjusts the reading on the total forced expiratory volume to read 100 percent. This automatically adjusts the reading for the timed forced expiratory volumes to percentages of the total. A push button with four separate sets of contacts, when depressed, will reset the peak detector circuits for each of the analog memory channels, thereby rendering the system ready for another set of tests.

A fifth memory channel, similar to the others but including a differentiator circuit, may be added to store a signal representative of the peak flow rate for all three tests for a given subject.

Other features and advantages of the present invention will be apparent to persons skilled in the art from the following detailed description of a preferred embodiment accompanied by the attached drawing.

THE DRAWING

FIG. 1 is a fragmentary perspective view of an instrument constructed according to the present invention;

FIG. 2 is a diagrammatic view showing the generation of the electrical signal representative of expiratory volume; and FIG. 3 is a diagram of a system incorporating the present invention partially in schematic form and partially in functional block diagram form.

DETAILED DESCRIPTION

Referring then to FIG. 1, reference numeral 10 generally designates an instrument constructed according to the present invention including a cabinet 11 for housing the circuitry, four facing display meters designated respectively 12–15 and recording respectively forced expiratory volume (FEV), the first timed expiratory volume ($FEV_1$), the second timed expiratory volume ($FEV_2$), and the third timed expiratory volume ($FEV_3$). The three timed forced expiratory volumes are taken respectively at 1-second, 2-second and 3-second intervals from the initiation of each test, as will be explained further below. Attached to one side of the instrument 10 is a mechanical measuring device generally designated by reference numeral 16 which includes a sheet of graph paper 17 mounted on a vertically reciprocable platen 18. A T-bar link 19 holds a stylus 20, and the link 19 moves to the left of FIG. 1 as a person exhales into the instrument. The leftward movment of the T-bar link and stylus is representative of the expiratory volume, and the plate 18 is moved downwardly in timed relation with a person's expiration into the instrument so that a curve, such as the curve 21 is recorded on the graph paper 17 representative of a single test of forced expiratory volume.

Turning now to FIG. 2, the base leg of the T-bar linkage 19 is seen as connected to the movable end of an expandable bellows 23, the other end of which is anchored. The interior of the bellows is communicated with the breath of a subject via a breathing tube partially shown at 24.

The structure of the T-bar linkage, bellows, mechanism for driving the platen, etc. is similar to that which is described in my U. S. Pat. No. 3,086,515, issued Apr. 23, 1963; and reference is made to that patent for further details.

For the present invention, a rack gear 25 is connected to the base leg of the T-bar linkage 19, and meshing with the teeth of the rack gear 25 is driven gear 26 secured to a transverse shaft 27 which drives a wiper arm 28 of an electrical potentiometer 29 or variable resistor. Expansion of the bellows 23 as a person exhales into it through the breather tube 24 causes the T-bar linkage 19 to move to the left in FIG. 2, as described in my above-identified patent. The stylus 20 records the volume of the expired breath on the graph paper 17 which is moved downwardly linearly with time. As the T-bar linkage 19 moves to the left, the wiper arm 28 of the potentiometer 29 is driven toward a higher potential by means of the rack gear 25 and driven gear 26. Thus, the signal generated at the wiper arm 28 is representative of the linear movement of the T-bar linkage and, hence, it is representative of the expired volume of the person under test.

Turning now to FIG. 3, the wiper arm 28 is connected to a conductor 31 which couples the signal representative of expiratory volume to the input of four separate analog memory channels designated respectively by reference numerals 32, 33, 34 and 35. The analog memory channel 32 has as its function the recording of the total forced expiratory volume, and it is similar in circuit structure to the remaining analog memory channels 33-35 except that the latter channels are actuated in timed relation with the initiation of a test. For this purpose, referring back to FIG. 2, a cam 30 is connected to the base leg of the T-bar linkage 19, and it is adapted to close a switch **30*a* as soon as the T-bar linkage 19 begins its motion to the left. The switch 30*a* is shown in the upper left-hand corner of FIG. 3 as a normally open switch, one contact of which is connected to a power supply and the other contact of which is connected to the input of a 1-second timer generally designated 33*a*, a 2-second timer circuit 34*a* and a 3-second timer circuit 35*a*. The timer circuits 33*a*–35*a* are associated respectively with the analog memory channels 33–35** in a manner to be described presently.

Returning now to the analog memory channel 32, the signal on the wiper arm 28 of the potentiometer is coupled by means of a resistor 36 to one input of a conventional differential amplifier 37, the output of which is connected to a peak detector circuit generally designated by reference numeral 38. The peak detector circuit 38 includes a diode 39, a resistor 40 and a capacitor 41. The junction between resistor 40 and capacitor 41 is connected to one input of a second differential amplifier 42 having unity voltage gain. The same junction is also connected to one terminal of a normally open push switch 43 having its other terminal grounded. The push switch 43 resets the peak detector 38 by grounding the signal storage terminal of the capacitor 41, and there are four separate normally open sets of contacts which are all closed when the push switch 43 is actuated to reset the four analog memory channels.

The output of the amplifier 42 is directly connected to the other input thereof so as to achieve a unity gain amplifier. The output of the differential amplifier 37 is connected to a capacitor 44, the other terminal of which is connected to the other input of amplifier 37; and a diode 45 is connected across the capacitor 44 with the cathode of the diode 45 connected to the anode of the diode 39. A resistor 46 connects the other input of differential amplifier 42 to the anode of diode 45.

The amplifiers 37, 42 are preferably operational amplifiers having high input impedences so as to not to load their associated driving circuits. The capacitor 41 has a relatively high capacitance as compared with the capacitor 44 as the capacitor 41 is the storage capacitor for the peak detector circuit 38. The arrangement of the capacitor 44, diode 45 and resistor 46 compensate for the charged time on the storage capacitor 41. That is, the output of the differential amplifier 37 sees the equivalent of a resistance load, not a high capacitive load as it would otherwise see.

The output of amplifier 42 is connected to a common terminal of two variable resistors designated respectively 48 and 49, the other terminals of which are connected to separate terminals of a two-position switch generally designated by reference numeral 50. The movable contact of the switch 50 is connected to one terminal of a current meter 51 which measures total forced expiratory volume when the movable contact of switch 50 is positioned in the upper position of the two illustrated. The resistor 48 is a calibration resistor, preferably not accessible to an operator; so that when the switch 50 is in an upper position, the meter 51 measures a signal representative of total forced expiratory volume in absolute terms. The pointer and dial of the meter 51 correspond with the face of meter 12 attached to the cabinet 10 in FIG. 1.

The variable resistor 49 has its variable arm ganged with three similar resistors designated respectively **49*a*,**

49*b* and 49*c* and associated respectively with the analog memory channels 33–35. Similarly, the movable arm of switch 50 is ganged with the movable arms of three separate switches designated 50*a*, 50*b* and 50*c*, associated respectively with the analog memory channels 33–35.

Turning now to the timer network 33*a*, it is intended to generate a signal at a preset time (1 second in the illustrated embodiment) after the closing of the switch 37 which is responsive to the initiation of a test. This signal then energizes a relay coil 54. When energized, the relay coil 54 will open an associated pair of normally-closed contacts 55 which are connected in series with the input of the 1-second memory channel 33.

The timer 33*a* includes a programmable unijunction transistor designates 56 having one power terminal lead 56*a* connected to the junction between a capacitor 57 and a variable resistor 58. The other power termianl 56*b* of the programmable unijunction transistor 56 is connected to the junction of a voltage divider network including a resistor 60 and a resistor 61 connected in series between ground and the positive power supply (indicated by a + sign) when the switch 37 is closed.

Connected in the cathode circuit of the programmable unijunction transistor 56 is a resistor 62; and the junction between the two elements is connected to the gate lead of a silicon control rectifier 63 in the cathode circuit of which there is connected a resistor 64. Across the series circuit of the silicon control rectifier 63 and resistor 64 there is a capacitor 65.

In operation, the timer 33A operates as follows. Normally both the programmable unijunction transistor 56 and the silicon control rectifier 63 are in a non-conducting state. When the switch 37 closes in response to the beginning of a test, voltage is coupled to the circuit, and the second power terminal 56b of the programmable unijunction transistor 56 is thereupon supplied a positive voltage. The first power terminal 56a thereof is, however, connected to ground until the capaictor 57 begins to build up a positive voltage through the variable resistor 58. When the voltage on the power terminal 56a equals the voltage on the second power terminal 56b of the programmable unijunction transistor 56, the transistor conducts, thereupon immediately discharging capacitor 57 and generating a single positive voltage spike across resistor 62. It will be observed that by varying the resistor 58, the charging time for the capacitor 57 is conveniently varied, so that the resulting voltage spike occurs at a predetermined time.

The voltage spike thus generated is coupled to the gate of the silicon control rectifier 63 and causes it to conduct. Charge stored on the capacitor 65 insures that the silicon control rectifier 63 will continue to conduct once it is triggered because of the high inductive load of the coil 54. Thus, the coil 54 is energized at a predetermined time after the switch 37 is closed to open the contacts 33 and thereby disconnect the signal from the potentiometer 29 from the input of the first analog memory channel 33.

The analog memory channel 33 includes an amplifier circuit 37*a* similar to the previously-described input amplifier for the first memory channel. A peak detector circuit 38*a*, also similar to the previously-described peak detector circuit 38 receives the output of the amplifier circuit 37*a* and, in turn, feeds a unity gain amplifier 42*a*. A second set of contacts associated with the push switch 43 resets the peak detector circuit 38*a* associated with the memory channel 33. Also included in the memory channel 33 is a variable resistor 48*a* which performs a function similar to the previously-described resistor 48 in calibrating this memory channel.

Turning now to the third analog memory channel 34, the two-second timer circuit 34A is similar to the previously-described timer circuit 33A, except that it energizes an associated relay 54A at a 2-second interval after the closing of switch 37. Normally closed contacts 55*a* actuated by the relay 54A are interposed between the wiper arm 28 and an input amplifier circuit 37*b* in the 2-second memory channel 34. The 2-second memory channel 34 includes a peak detector circuit 38*b*, a unity gain amplifier 42*b*, and a calibration resistor 48*b*, all of which perform functions previously described. The output signal of the memory channel 34 is connected to a meter 51*b* which measures the forced expiratory volume at a two-second interval after the initiation of a test. A similar meter 51*a* is connected to the movable contact 50*a* of the memory channel 33 to measure forced expiratory volume 1 second after the closing of switch 37.

The fourth memory channel (namely, the 3-second forced expiratory volume channel) includes the 3-second timer circuit 35A which energizes a relay 54B at a period of 3 seconds after the closing of switch 37. The relay 54B thereupon opens normally closed contacts 55*b* which are interposed between the wiper arm 20*a* of the potentiometer 29 and an input amplifier circuit 37*c*. The memory channel 35 also includes a peak detector circuit 38*c* which is resettable, a unity gain amplifier 42*c* and the calibration resistor 48*c*. The output of the switch 50*c* is fed to a meter 51*c* which measures the third timed forced expiratory volume.

Although it is not necessary for the operation of the invention, a fifth memory channel, generally designated 70 in FIG. 1 may be added, if desired, to generate and store a signal representative of the peak flow rate. As has already been mentioned, the signal generated by the potentiometer 29 is representative of expired volume. At the beginning of the memory channel 70, there is a capacitor 71 which, together with the high input impedance of an amplifier circuit 72, similar to the previously described amplifier 37, forms a differentiating circuit. Thus, the output of the amplifier 72 is a signal representative of the flow rate of the expired gas. The output of the amplifier circuit 72 is connected to the input of a peak detector circuit 73 which is similar to the previously-described peak detector 38 and which is reset by means of the push button 43. The output of the peak detector circuit 73 is then fed through a unity gain amplifier 74 to a meter 75 which displays a signal representative of the peak flow rate for all tests that have been run for a given patient.

OPERATION

The function of each of the elements of the system, and its operation, have been briefly described in connection with the description of the element itself; it is therefore intended here to present a brief summary of the over-all system operation, relating each element to related elements, where required.

A person's breath, upon forced expiration, is coupled into the bellows 23 to drive the T-bar linkage 19 to the left and, simultaneously, the platen 18 is moved downward so that the stylus 20 records the expiratory volume as a function of time on graph paper 17.

As the T-bar linakge 19 begins to move leftward in response to an expanding bellows 23, the switch 30a is closed by a cam 30; and it remains closed during each test.

Referring to FIG. 3, when the switch 30a closes power is supplied to each of the timers 33A, 34A and 35A which energize the coils of their associated relays 54, 54A and 54B at predetermined periods of 1 second, 2 seconds and 3 seconds after test initiation respectively. Prior to the energization of the relays 54, 54A, and 54B, the input amplifier circuits 37*a*–37*c* of the three timed analog memory channels 33–35 are coupled directly to the wiper arm 28 of the potentiometer 29. The wiper 28 is driven by means of the drive gear 26 and rack gear 25 which is attached to the T-bar linkage 19. For the first one-second interval, the signal generated at the wiper arm 28 representative of instantaneous forced expiration volume will be amplified and stored in the peak detector circuits of each of the four channels 32–35. At this time, the switches 50–50*c* are set to the upper position as viewed in FIG. 3 so that the meters 51–51*c* (and their associated display panels 12–15 on the instrument 10) display measurements representative of the increasing expired volume within the bellows 23. However, at the end of the first 1-second interval, the relay 54 of the 1-second timer circuit will be energized to open the normally closed contact 55, thereby interrupting the coupling of the input signal to memory channel 33. The signal will, of course, continue to be stored in the peak detector circuit 38*a* and displayed on the meter 51*a*.

At the end of the 2-second interval, a similar action opens the contact 55*a* so that stored in the peak detector circuit 38*b* is a signal representative of the forced expiratory volume at the end of the 2-second period. At the end of the 3 second, the 3-second timer circuit 35A energized relay 54B to open the contact 55*b* thereby storing in peak detector circuit 38*c* a signal representative of forced expiratory volume at the end of the 3-second period.

Total forced expiratory volume continues to be recorded in the peak detector circuit 38 and measured by meter 51.

Three successive tests are run, all of which are recorded on the graph paper 17. Before the running of each test, the push button 43 is depressed to reset the peak detector circuits, and the T-bar linkage is returned to its original position, thereby re-setting the timer circuits. Thus, in the conduction of subsequent tests, if the forced expiratory volume at any of the timed intervals or the total forced expiratory volume exceeds any of the values recorded in the peak detector circuits associated with the various analog memory channels, those signals will be increased correspondingly so that in each peak detector circuit there is recorded a maximum signal representative of the largest forced expiratory volume for all three tests.

An observation by an experienced technician of the recorded curves 21 on graph 17 will indicate whether or not the test is valid; and if so, the peak values for the largest of the tests will be recorded on the display panels 12–15 from which they may easily be recorded. It will be observed that each of the meters 51–51*c* may be replaced by a more permanent record means such as an analog to digital converter with a card punch, or equivalent means.

If it is desirable to record the forced expiratory volumes at the time intervals as a percentage of total forced expiratory volume, the operator simply moves the switch 50 (and its associated ganged switches 50*a*–50*c*) to the lower illustrated position and adjusts the potentiometers 49–49*c* until the meter 51 reaches 100 percent. The signals displayed on the other meters, then, will be represented as a percentage of the total recorded forced expiratory volume.

If the peak flow rate memory channel 70 is included in the system, it is reset when all of the other channels are reset by the push button 43. Then, upon each test, the volume signal generated at the line 31 is differentiated in the capacitor 71 and a signal representative of peak flow rate is stored at a peak detector circuit 73 and displayed on the meter 75.

Persons skilled in the art will be able to modify certain portions of the system described and to substitute equivalent elements for those which have been disclosed while continuing to practice the principles of the invention; and it is, therefore, intended that all such modifications and substitutions be covered as they are embraced within the spirit and scope of the appended claims.

We claim:

1. A system for measuring forced expiratory volume and timed forced expiratory volume simultaneously comprising: first means responsive to expired breath of a person under test for causing motion as a function of total instantaneous forced expiratory volume; electrical circuit means actuated by said first means responsive to expired breath for generating a signal representative of instantaneous forced expiratory volume; a plurality of memory channel means each including a signal storage circuit means and receiving said signal representative of instantaneous forced expiratory volume for storing a signal representative of the peak value thereof, at least one of said plurality of channels including timer circuit means for generating a marker signal a predetermined time after the initiation of a test for actuating its associated storage circuit means at said predetermined time after the initiation of a test such that said one channel stores a signal representative of forced expiratory volume at said predetermined time after test initiation; first reset circuit means for resetting said timer circuit means; second manually operable reset circuit means for resetting said signal storage circuit means independently of the resetting of said timer circuit means whereby a number of tests may be run in succession and the signal stored in each of said storage circuits represents the maximum value of expired volume for the associated time; and output means receiving said stored signals.

2. The system of claim 1 wherein said plurality of memory channel means include a first channel having a signal storage circuit means for storing a signal representative of the maximum total forced expiratory volume for number of tests run in succession; said system further including second, third and fourth timed memory channel means each having an associated signal storage circuit means and timer circuit means storing respectively signals representative of the largest timed forced expiratory volumes at different predetermined time intervals after the initiation of a test.

3. The system of claim 2 further comprising ganged variable resistor means, one such means included in each memory channel means, the ganged variable resistive means associated with the first channel being settable to an indicia representative of 100 per cent, the remaining ganged variable resistive means thereupon being set to generate signals representative of percentages of the signal stored in said first channel.

4. The system of claim 3 wherein said last-named memory channel means comprises a differentiating circuit for differentiating said signal representative of instantaneous forced expiratory volume; peak detector circuit means receiving said signal of said differentiator circuit means for storing a signal representative of the peak expired flow rate of a person for a plurality of tests; and output means for measuring the stored signal.

5. The system of claim 4 wherein said output means of said last-named memory channel means comprises display means for displaying said signal representative of peak expired flow rate.

6. A system fo measuring forced expiratory volume and timed forced expiratory volume comprising: first means including a bellows for receiving the expired breath of a person under test and a link connected to move with the expansion end of bellows and being linearly displaced as a function of instantaneous forced expiratory volume; electrical circuit means including a variable resistor means driven by said first means for receiving the expired breath for generating a first analog signal linearly representative of instantaneous forced expiratory volume; a plurality of analog memory channel means each including a peak detector circuit means and signal storage circuit means coupled to the output of said peak detector circuit means and storing a signal representative of the peak value thereof, one of said memory channel means storing a signal representative of total forced expiratory volume and another of said memory channels including a timer circuit means actuated at the start of each test by said mechanism to disconnect its associated storage circuit means at a predetermined time after the start of a test to store a signal representative of expired volume at said predetermined time; reset means for resetting said timer circuit means independently of the resetting of said storage circuit means; and output means receiving said stored signals whereby a plurality of tests may be run, said peak detector circuit means thereby storing a signal representative of the largest peak value of said first analog signal encountered in all of said tests.

* * * * *